US009418110B1

(12) United States Patent
Shmuylovich et al.

(10) Patent No.: US 9,418,110 B1
(45) Date of Patent: Aug. 16, 2016

(54) INTELLIGENT, SCALABLE, LOW-OVERHEAD MECHANISM FOR DATA RETRIEVAL IN A DISTRIBUTED NETWORK ENVIRONMENT

(75) Inventors: Samuil Shmuylovich, Framingham, MA (US); Anoop George Ninan, Milford, MA (US); Boris Farizon, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 1149 days.

(21) Appl. No.: 12/164,595

(22) Filed: Jun. 30, 2008

(51) Int. Cl.
G06F 17/30 (2006.01)

(52) U.S. Cl.
CPC .................... *G06F 17/3051* (2013.01)

(58) Field of Classification Search
CPC .................... G06F 17/30; G06F 17/00
See application file for complete search history.

(56) References Cited

U.S. PATENT DOCUMENTS

| | | | | | |
|---|---|---|---|---|---|
| 4,415,792 A | * | 11/1983 | Jordan | ................ | 219/98 |
| 4,451,108 A | * | 5/1984 | Skidmore | ............. | 439/536 |
| 4,455,483 A | * | 6/1984 | Schonhuber | ............. | 705/28 |
| 4,502,082 A | * | 2/1985 | Ragle et al. | ............. | 360/76 |
| 4,796,260 A | * | 1/1989 | Schilling et al. | ............. | 714/755 |
| 4,972,474 A | * | 11/1990 | Sabin | ............. | 380/28 |
| 5,177,796 A | * | 1/1993 | Feig et al. | ............. | 382/236 |
| 5,274,508 A | * | 12/1993 | Tan et al. | ............. | 360/48 |
| 5,280,584 A | * | 1/1994 | Caesar et al. | ............. | 710/53 |
| 5,303,393 A | * | 4/1994 | Noreen et al. | ............. | 455/3.02 |
| 5,319,395 A | * | 6/1994 | Larky et al. | ............. | 345/605 |
| 5,321,699 A | * | 6/1994 | Endoh et al. | ............. | 365/185.17 |
| 5,365,516 A | * | 11/1994 | Jandrell | ............. | 370/335 |
| 5,377,102 A | * | 12/1994 | Nishiishigaki | ............. | 702/5 |
| 5,382,508 A | * | 1/1995 | Ikenoue | ............. | 430/496 |
| 5,386,422 A | * | 1/1995 | Endoh et al. | ............. | 365/185.22 |
| 5,388,074 A | * | 2/1995 | Buckenmaier | ............. | 365/189.05 |
| 5,440,686 A | * | 8/1995 | Dahman et al. | ............. | 345/537 |
| 5,469,444 A | * | 11/1995 | Endoh et al. | ............. | 714/722 |
| 5,477,492 A | * | 12/1995 | Ohsaki et al. | ............. | 365/200 |
| 5,481,531 A | * | 1/1996 | Yamamuro | ............. | 369/47.3 |
| 5,506,965 A | * | 4/1996 | Naoe | ............. | 709/209 |
| 5,507,024 A | * | 4/1996 | Richards, Jr. | ............. | 455/260 |
| 5,511,212 A | * | 4/1996 | Rockoff | ............. | 712/22 |
| 5,526,357 A | * | 6/1996 | Jandrell | ............. | 370/346 |
| 5,537,945 A | * | 7/1996 | Sugihara et al. | ............. | 112/470.06 |
| 5,561,671 A | * | 10/1996 | Akiyama | ............. | 714/799 |
| 5,583,975 A | * | 12/1996 | Naka et al. | ............. | 345/426 |
| 5,657,398 A | * | 8/1997 | Guilak | ............. | 382/232 |
| 5,684,693 A | * | 11/1997 | Li | ............. | 702/6 |
| 5,684,774 A | * | 11/1997 | Yamamuro | ............. | 369/47.28 |
| 5,724,241 A | * | 3/1998 | Wood et al. | ............. | 702/14 |

(Continued)

*Primary Examiner* — Farhan Syed
(74) *Attorney, Agent, or Firm* — Krishnendu Gupta; Robert Kevin Perkins; Gerald P. Kazanjian

(57) ABSTRACT

Techniques disclosed herein describe a data retrieval process for storing management data from a network environment using an efficient polling-based approach without sacrificing the real-time aspect of data retrieval that a push model provides. The process is highly scalable and reliable, and is useful in Network Address Translation (NAT) environments because the number of holes in a NAT firewall is minimized. The data retrieval component uses intelligent polling to retrieve data and store the data in a central database without overloading the system. A data retrieval component polls a data collection agent for a dataset. The data collection agent transfers the data set and a poll indication of when a subsequent data set will be ready for transfer. Subsequent polling is based on a processor load at a data retrieval component.

19 Claims, 6 Drawing Sheets

(56) References Cited

U.S. PATENT DOCUMENTS

| | | | |
|---|---|---|---|
| 5,742,509 A * | 4/1998 | Goldberg et al. | 701/211 |
| 5,751,967 A * | 5/1998 | Raab et al. | 709/228 |
| 5,764,691 A * | 6/1998 | Hennedy et al. | 375/152 |
| 5,784,366 A * | 7/1998 | Apelewicz | 370/342 |
| 5,805,155 A * | 9/1998 | Allibhoy et al. | 725/115 |
| 5,831,903 A * | 11/1998 | Ohuchi et al. | 365/185.22 |
| 5,841,717 A * | 11/1998 | Yamaguchi | 365/205 |
| 5,848,072 A * | 12/1998 | Prill et al. | 370/471 |
| 5,877,742 A * | 3/1999 | Klink | 345/685 |
| 5,894,494 A * | 4/1999 | Davidovici | 375/150 |
| 5,909,435 A * | 6/1999 | Apelewicz | 370/342 |
| 5,917,429 A * | 6/1999 | Otis et al. | 340/870.31 |
| 5,999,562 A * | 12/1999 | Hennedy et al. | 375/152 |
| 6,072,185 A * | 6/2000 | Arai et al. | 250/492.22 |
| 6,178,121 B1 * | 1/2001 | Maruyama | 365/189.09 |
| 6,181,609 B1 * | 1/2001 | Muraoka | 365/189.05 |
| 6,237,122 B1 * | 5/2001 | Maki | 714/730 |
| 6,243,348 B1 * | 6/2001 | Goodberlet | 369/101 |
| 6,249,824 B1 * | 6/2001 | Henrichs | 710/8 |
| 6,367,037 B1 * | 4/2002 | Remer et al. | 714/47.1 |
| 6,550,057 B1 * | 4/2003 | Bowman-Amuah | 717/126 |
| 6,792,455 B1 * | 9/2004 | DeLuca et al. | 709/224 |
| 7,006,440 B2 * | 2/2006 | Agrawal et al. | 370/235 |
| 7,107,285 B2 * | 9/2006 | von Kaenel et al. | |
| 7,197,489 B1 * | 3/2007 | Gauvin et al. | |
| 7,234,073 B1 * | 6/2007 | Roytman et al. | 714/4.11 |
| 7,469,290 B1 * | 12/2008 | Liubovich et al. | 709/225 |
| 8,838,553 B2 * | 9/2014 | von Kaenel et al. | 707/694 |
| 8,838,555 B2 * | 9/2014 | Von Kaenel et al. | 707/694 |
| 8,918,730 B2 * | 12/2014 | von Kaenel et al. | 715/764 |
| 8,983,896 B2 * | 3/2015 | von Kaenel et al. | 707/602 |
| 2004/0117358 A1 * | 6/2004 | von Kaenel et al. | 707/3 |
| 2005/0071470 A1 * | 3/2005 | O'Brien et al. | 709/226 |
| 2007/0050340 A1 * | 3/2007 | von Kaenel et al. | 707/3 |
| 2007/0143827 A1 * | 6/2007 | Nicodemus et al. | 726/2 |
| 2007/0185914 A1 * | 8/2007 | Prahlad et al. | 707/200 |
| 2009/0089254 A1 * | 4/2009 | Von Kaenel et al. | 707/3 |
| 2010/0114941 A1 * | 5/2010 | Von Kaenel et al. | 707/769 |
| 2011/0004830 A1 * | 1/2011 | Von Kaenel et al. | 715/751 |
| 2011/0219035 A1 * | 9/2011 | Korsunsky et al. | 707/784 |
| 2011/0270833 A1 * | 11/2011 | von Kaenel et al. | 707/736 |

* cited by examiner

INTELLIGENT, SCALABLE, LOW-OVERHEAD MECHANISM FOR DATA RETRIEVAL IN A DISTRIBUTED NETWORK ENVIRONMENT

RELATED APPLICATION

This application hereby incorporates by reference, co-pending U.S. patent application Ser. No. 11/169,463, entitled TRANSACTION LIFECYCLE MANAGEMENT IN DISTRIBUTED MANAGEMENT SYSTEMS, filed Jun. 29, 2005, the contents of which are herein incorporated by reference in their entirety.

BACKGROUND

The rapid expansion of information service and data processing industries has resulted in a need for computer systems to manage and store large amounts of data. As an example, financial service industry businesses such as banks, mutual fund companies or the like often operate large and complex data processing systems that require access to many hundreds of gigabytes or even terabytes of data. Data storage system developers have responded to these types of data storage requirements by integrating large capacity data storage systems, data communications devices and computer systems into networks called "storage networks" or "storage area networks" (SANs). A storage area network is a collection of data storage systems that are networked with a number of host computer systems that operate as servers to access data stored in the data storage systems.

Elements of a typical conventional storage area network implementation include one or more connectivity devices such as high speed data switches or routers that interconnect the various data storage systems to each other and to one or more host or server computer systems (servers) that require access to (e.g., read and/or write) the data in the data storage systems on behalf of client software applications and/or client computer systems.

A developer or administrator of such a storage area network environment may install one or more distributed storage area network management software applications within the storage area network to manage or administer the various elements (i.e., devices, computer systems, storage systems, etc.) that operate within the storage area network. A network manager (i.e., a person) responsible for management of the storage area network operates the network management software application to perform management tasks such as performance monitoring, network analysis and remote configuration and administration of the various components operating within the storage area network.

A typical conventional storage area network management software application may have several different software components that execute independently of each other on different computer systems but that collectively interoperate together to perform network management. As an example, conventional designs of storage area network management applications can include console, server, agent and storage software components.

Generally, the server component operates as a central control process within the storage area network management application and coordinates communication between the console, storage (i.e. store) and agent components. The console component often executes within a dedicated storage area network management workstation to allow the network administrator to visualize and remotely control and manage the various elements within the storage area network that are graphically represented within the console. Agent components execute on host computer systems such as servers within the storage area network to manage storage area network elements. As an example, there may be different respective agents specifically designed (e.g., coded) to remotely manage and control data storage systems, database applications, switches, and so forth. Agent components receive remote management commands from the server component and apply functionality associated with those management commands to the managed elements within the storage area network for which those agents are designated to manage. Agents are also responsible for periodically collecting configuration or management data concerning the storage area network elements that those agents are responsible for management. Agents can transmit this collected management data back to a storage component. The storage component receives the collected management data from the agents and processes and stores this information into a storage area network management database. The console component can obtain current information such as performance, capacity, load or other data concerning managed elements within the storage area network by accessing the element configuration data in the network management database.

Different components of the storage area network may be located remotely from each other. For example, the agents may be located remotely from the server and storage components, and communicate with them over a network such as the Internet. A firewall may be used on the network between the agent and other parts of the system. The firewall is used to provide a measure of security such that the server and storage components are not available (such as by having their IP addresses published) to other people or systems. NAT is now commonplace and comes from a number of factors including a shortage of IP addresses, security needs and ease and flexibility of network administration.

Enterprise Storage Networks are large and complex environments that include various elements such as storage arrays, switches, hosts and databases all inter-networked. These elements occur in several hundreds in such environments. These elements in turn may consist of several hundred thousands of manageable elements such as storage devices, storage and switch ports, database instances, host devices and file systems, and the like. Management of such environments is a daunting task and typically requires Storage Resource Management solutions such as EMC ControlCenter® (ECC) storage area network management family of products, available from EMC Corporation of Hopkinton, Mass. ECC includes agents that are deployed for the purpose of gathering data about various storage elements, components that process and persist data, applications that use persisted information to enable the management of these environments. ECC identifies the entire process of retrieving the collected data from agents to data persistence as a transaction. The sizes of collected data range from a few kilobytes to several hundred megabytes. Processing these from as many agents as there are deployed can be complex, time-consuming and failure-prone.

SUMMARY

In conventional approaches, retrieval of management data within a distributed network environment is traditionally transferred, processed and stored to a database using a push model. Within such an environment there are data collectors, such as agents, that are executing on a network gathering data. There are conventional data processors, which can be called data stores or data retrieval components, to which the agent can push data to be stored in a central database. There is a security problem with this conventional approach. This conventional approach requires significant IT security involvement because many security holes (i.e. TCP ports open in NAT firewalls) must be opened to allow remotely executing agents to push their data to the storage or data retrieval component. The system disclosed herein recognizes a problem that exists within many networks. The problem is that network administrators do not prefer to allow such open additional security holes. The infrastructure of servers, stores, and databases are typically protected by a network address translation firewall (NAT) that restricts access by data collection agents. To operate under such restrictions it is necessary to minimize the number of holes in a firewall. Another problem recognized and overcome by the system disclosed herein is that the push model cannot be used for scalable real-time data collection. The reason is because there would be a bottleneck at the data retrieval component from thousands of data collection agents constantly sending (i.e. pushing) data without adequate synchronization between the agents themselves. Processing all this pushed data would consume all available CPU cycles and can cause data retrieval components to experience overloading and/or downtime. Thus, the push model is not scalable. It is common for data retrieval components reside on a central server of a management system. Such a central server of a management system needs to be highly available and thus cannot receive such a load.

Techniques disclosed herein significantly overcome these deficiencies without sacrificing the real-time aspect of data retrieval. For example, as will be discussed further, certain specific embodiments herein are directed to a data retrieval process that substitutes pushing with polling (or pulling). In this retrieval process, a data collection agent initially (i.e. once) communicates to a management server. The management server reads the IP address of the data collection agent from the socket, and forwards that IP address—along with instructions for data retrieval—to a data retrieval component. The IP address that is read is a local IP address in a NAT environment. The data retrieval component then uses intelligent polling to retrieve data from the agent and store the data in a central database without overloading the system using the IP address provided. This allows the solution to work when the data retrieval component is behind a firewall. Alternatively, the data retrieval component processes data to a local disk to be consumed by an application.

Data collected by the data collection agent can be a large file size such as a megabyte of data, or this could be performance data. For example, a particular data collection agent might be assigned to monitor a switch link. The data collection agent may take a frequent snapshot to identify traffic on the link. Used by another application, this data can be useful to produce a graphic to show traffic plotted over time, with the capability to investigate why the traffic was high at a particular time. To "drill down" on such data in real-time requires more collected data.

It is common that data retrieval components are located on a central host computer system or server computer, and that a network administrator of the central server authorizes only one hole to be opened in the NAT firewall, and that hole is for a management server—not for the many data retrieval components. The fact that there is collected data available for retrieval is not initially known to the data retrieval component. If the data retrieval component polled frequently, there may be missed data pulls when data is not available. The data retrieval process optimizes polling so that polls from the data retrieval component are approximately lined up with the availability of data in the data collection agent. The solution balances network bandwidth consumption by polling, and with the number of hits depending on data availability from agents.

The management server propagates a schedule to data collection agents for collecting data. The data collection agent determines when to begin collecting data and how long it will take to collect data using the schedule. This lets the data collection agents dynamically tell the data retrieval components when to expect the next set of data using the a poll indication. The data collection agent is in the best position to know when to collect data and how long it will take to collect each data set.

When the data collection agent sends data to the data retrieval component, the data collection agent also indicates when the next data set will be available in a poll indication that is "piggybacked" onto the data transmission. It may be, however, that at the next time a dataset is ready, the data retrieval component may be busy and not able to retrieve the collected data. In this situation, the data retrieval component begins pulling off from when the data is ready at the data collection agent. The data collection agent is the best entity to know when the data is available. The data collection agent can also monitor and track delays. The data collection agent calculates delays based on a previous poll, from an average of 10 previous polls, or another calculation methodology.

One embodiment is a method for data retrieval in a distributed network environment. A data collection agent collects data from at least one managed resource in a distributed network. This data is collected into a dataset according to a predefined policy. This policy can be configured as needed by an administrator to collect data for an intended purpose. The data collection agent receives a poll from a data retrieval component. This poll is to retrieve the dataset. Responsive to this poll, the data collection agent transfers the dataset. The data collection agent also transfers a poll indication of when a subsequent data set will be available for retrieval. The data collection agent then continues to collect data from one or more managed resources in the network. The data collection agent collects such data into a subsequent dataset. The data collection agent receives a subsequent poll to retrieve a subsequent dataset. The data retrieval component polls for this dataset based on the poll indication of when a subsequent dataset will be available for retrieval.

The subsequent poll received from the data retrieval component, can be based on current processor load at the data retrieval component. The data collection agent transfers the subsequent dataset. The data collection agent can transfer multiple datasets collected between an initial poll and a subsequent poll. The predefined policy (configurable by an administrator) for collecting data can include a data collection frequency and/or thresholds for receiving data retrieval polls from the data retrieval component. When data retrieval activity violates the policy, the agent can execute a corrective action such as notifying a management server of the policy violation. The policy violation can be, for example, the agent detecting an absence of incoming polling requests within a predetermined period of time, or a pattern of polling request delays that violate a policy.

Another embodiment is a method for data retrieval in a distributed network environment. A data retrieval component receives an identification of a data collection agent from which to receive datasets. Such datasets contain data collected from at least one managed network resource. The data retrieval component polls the data collection agent for a dataset. The data retrieval component receives the dataset from the data collection agent. The data retrieval component also receives a poll indication of when a subsequent dataset will be available for retrieval. The data retrieval component polls a data collection agent for the subsequent dataset. The time of polling is based on the poll indication when the subsequent dataset will be available for retrieval. The subsequent poll time can also be based on a current processor load at the data retrieval component. The data retrieval component refrains from polling subsequent datasets when the current processor load exceeds a predefined level of activity. The data retrieval component notifies management server when polling activity fails to meet the predefined retrieval policy. Subsequent polling can retrieve all datasets collected since the previous poll. The data retrieval component stores retrieved data in a central database.

Yet other embodiments herein include software programs to perform the steps and operations summarized above and disclosed in detail below. The data retrieval process can be a stand alone software application and process, or may be a web-based application or even a web service. One such embodiment comprises a computer program product that has a computer-readable medium (e.g., a tangible computer readable media, disparately located or commonly located media) including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Also, it is to be understood that each of the systems, methods, and apparatuses herein can be embodied strictly as a software program, as a hybrid of software and hardware, or as hardware alone such as within a processor, or within an operating system or within a software application, or via a non-software application such as a person performing all or part of the operations. Example embodiments of the invention may be implemented in products and/or software applications such as those manufactured by EMC Corporation of Hopkinton, Mass., USA.

As discussed above, techniques herein are well suited for use in software applications supporting business service management infrastructure. It should be noted, however, that embodiments herein are not limited to use in such applications and that the techniques discussed herein are well suited for other services applications such as those where linking value to an information technology infrastructure is beneficial.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to one embodiment, a data retrieval application and/or process executes on a computerized device, such as a server computer, within a distributed network environment. The data retrieval process provides an efficient polling-based approach for retrieval of information without sacrificing the real-time aspect of data retrieval.

Figure 1:
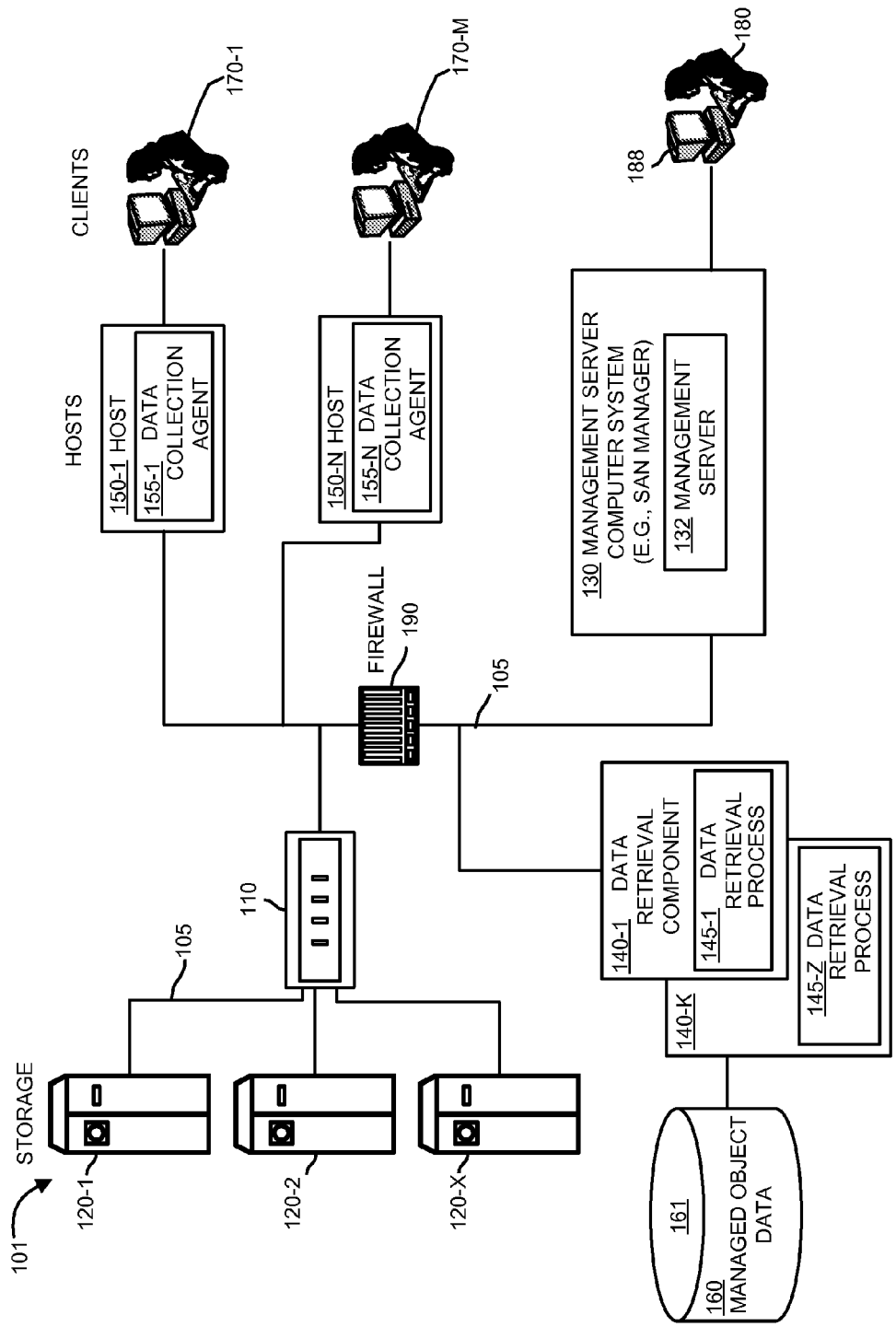
FIG. 1 is a high level diagram of the computing environment in which embodiments of the invention operate.

Referring now to FIG. 1, in which like elements are shown having like reference designators, FIG. 1 illustrates a diagram of a computing environment in which embodiments of the invention operate. In this example, the networking environment is a storage area network 101 that includes a communications medium 105 that interconnects a plurality of data storage systems 120-1 through 120-X (generally 120) through one or more connectivity devices 110 (e.g., storage area network switches) to a plurality of host computer systems 150-1 through 150-N (generally 150). According to the general operation of the storage area network shown in FIG. 1, client computer systems 170-1 through 170-M (generally 170) can operate various client software applications (not specifically shown) that communicate with server applications (not specifically shown) operating within the host computer systems 150 in order to access data stored within the data storage systems 120 over the storage area network 101.

Also illustrated in this storage area network 101 is a management server computer system 130 that operates a management server 132. In addition, the storage area network 101 includes one or more data retrieval/data storage component computer systems 140-1 through 140-K (generally 140) that, in this example, operate respective data retrieval processes 145-1 through 145-Z (generally 145) also configured in accordance with embodiments of the invention. A plurality of data collection agent software processes 155-1 through 155-N (generally 150) operate within one or more of the host computer systems 150-1 through 150-N (generally 150). Generally, the data collection agents 155 and data retrieval processes 145 interoperate with, and are collectively considered parts of the management server 132. A network administrator 180 interacts via a console 188 (e.g., another computer system) with the management server 132 executing on the management server computer system 130 in order to remotely administer manageable entities or resources within the storage area network 101 such as the data storage systems 120, the connectivity devices 110 and the host computer systems 150. Note that the console may be a process operating on the management server, a host or the storage computer system.

The collection agents 155 operate to periodically collect management data, performance data, and the like, concerning specific managed entities or managed resources associated with those agents 155. As an example, if the agent 155-1 is responsible for performing management functionality associated with one or more of the data storage systems 120, that agent 155-1 periodically queries or otherwise interacts with those data storage systems 120 for which it is assigned to manage in order to collect management data concerning the performance, configuration and/or other operational characteristics associated with those data storage systems 120. The management server 132 operates to allow the agents 155 to collect and transmit management data to a retrieval process 145 operating within one of the data retrieval components 140 for processing into managed object data 160 for placement into a management database 161. The management server 132 is thereafter able to access (not specifically shown) the managed object data 160 within the management database 161 for interpretation and presentation to the network administrator 180 and for use in other management purposes of managed entities within the storage area network 101.

Prior to storage of the management data 160 into the management database 161, however, the data retrieval process 145 typically pre-processes the management data for conversion into managed object data 160. This can involve conversion of raw text or string data into object data 160 for use within the database 161. There are numerous agents 155-1 through 155-N (e.g., N may be greater than several hundred or a thousand or more) that each periodically (and sometimes randomly or in response to certain events) collect and require transmission of management data to a retrieval process 145 for placement as managed object data 160 into the management database 161.

Note that the illustrated example in FIG. 1 is simplified with a single administrator 180 and each retrieval process 145 and each agent 155 operates individually on a respective separate storage or host computer system 140, 150. It is to be understood that this is not limiting to embodiments of the invention and there may be, for example, multiple administrators 180 as well as multiple agents 155 operating on a single host computer system 150. In addition, in an alternative configuration, there may be multiple retrieval processes 145 operating on a single storage computer system 140, though such an arrangement may experience performance contention issues.

An example of a transaction operation will now be discussed. The transaction begins with management server 130 receiving a request from agent 155. Such requests indicate that agent 155 has collected management data from one or more managed resources in a distributed network. In other words, data collection agent 155 tells management server 130 that data collection agent 155 has data ready to be retrieved. This only need to occur once to allow the management server 130 to associate the agent of a data retrieval process 145. To do so, the Management server 130 reads an IP address from the agent, and returns a ticket. Management server 130 locates a retrieval process 145 for communication with the agent. Management server 130 assigns data retrieval component 140 (i.e. a data retrieval process 145) to retrieve collected data from data collection agent 155, and provides a ticket and an IP address of data collection agent 155. The purpose of the ticket is for the data retrieval component 140/process 145 to contact data collection agents and to match the data collected by the agent. The agent can potentially collect multiple datasets, and be waiting for one or more data retrieval components to retrieve some or all of the datasets. At this point, the communications between the agent 155 and the management server 130 has taken place through firewall 190 however this is not an issue since the management server has its IP address made public. Using the ticket, the data retrieval component 140 then polls data collection agent 155 for collected management data. Thus, the data retrieval component 140/process 145 initiates communication with the data collection agent 155. In response to the poll for data, data collection agent 155 returns collected data and a poll indication of when a next data set will be available for retrieval. Data retrieval component 140 makes subsequent polls for datasets based on the poll indication received from the agent, and based on a current processor load of the data retrieval process.

Figure 2:
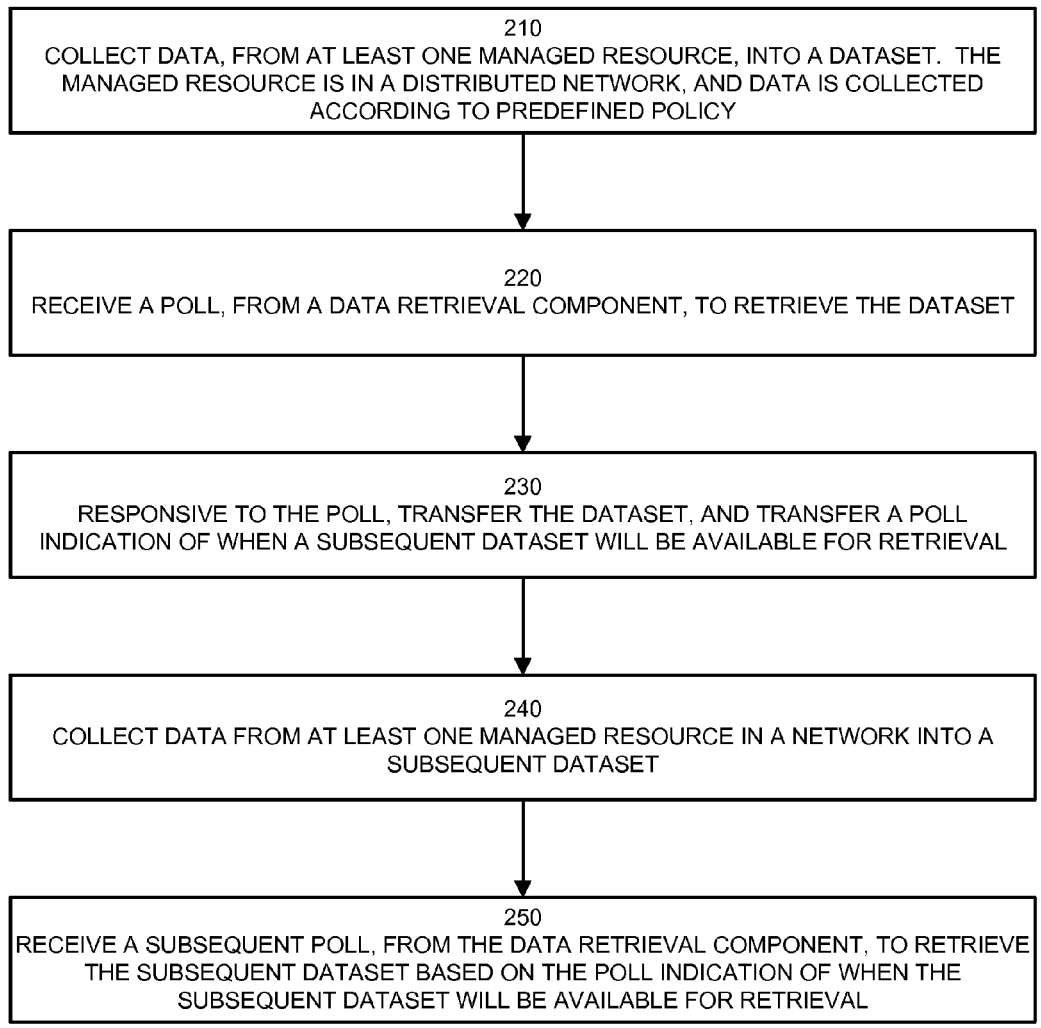
FIG. 2 is a flowchart illustrating an example method for data retrieval according to embodiments herein.

FIG. 2 is a flowchart of processing steps that data collection agent 155 performs to execute a data collection process in a distributed network environment.

In step 210, the data collection agent 155 collects data, from a least one managed resource (e.g. storage system 120), into a dataset. The managed resource is in a distributed network environment, and data collection agent 155 collects data according to a predefined policy that can be configured by an administrator. By way of a non-limiting example, the managed resources can be any hardware or software components on the network, such as a router, switch, storage system (e.g. 120) or application program. The predefined policy can be configured by a network administrator, and can be based on the activity characteristics of the managed resources from which data is collected. For example, datasets can be collected every minute or every five minutes, or after reaching a defined level of activity from the managed resources.

In step 220, the data collection agent 155 receives a poll, from a data retrieval component, to retrieve the dataset. The poll comes from a data store process or the data retrieval component 140. Receiving a poll from the data retrieval component is advantageous compared to the data collection agent initiating communication, because the data retrieval component does not need to open a separate NAT firewall hole dedicated to the data collection agent. Opening a separate, dedicated connection for the data collection agent would reduce security.

In step 230, responsive to the poll, the data collection agent 155 transfers both the dataset and a poll indication of when a subsequent dataset will be available for retrieval. That collection agent transfers the dataset and the poll indication within one communication session. Each item can be transferred simultaneously or in succession. There can be one or more back-and-forth communications between the data collection agent and the data retrieval component to make the transfer, but it is the same session. In other words, this step is a pull process instead of a push process. Upon receiving a request for data, the data collection agent transfers requested data and tells the data retrieval component when more data will be available to retrieve.

In step 240, the data collection agent 155 collects data from at least one managed resource in a network into a subsequent dataset. In other words, after the data collection agent transfers a dataset, the data collection agent continues to collect data from managed resources according to the predefined collection policy. Continuous data collection is important for monitoring operations within a storage area network. In other embodiments, the data collection agent 155 is responsible for collecting performance data from multiple managed network resources. Each managed data collection has its own schedule. The data collection agent 155 can combine datasets from multiple managed network resources into one pull. Thus, the data retrieval component 140 does not need to poll for each individual dataset, but multiple datasets can be transmitted at the same time.

In step 250, the data collection agent 155 receives a subsequent poll, from the data retrieval component, to retrieve the subsequent dataset based on the poll indication of when the subsequent dataset will be available for retrieval. In other words, the pull model for data retrieval is functional because the data retrieval component 140 knows when to poll for the next available dataset based on the poll indication received during the process of obtaining the previous dataset.

Figure 3:
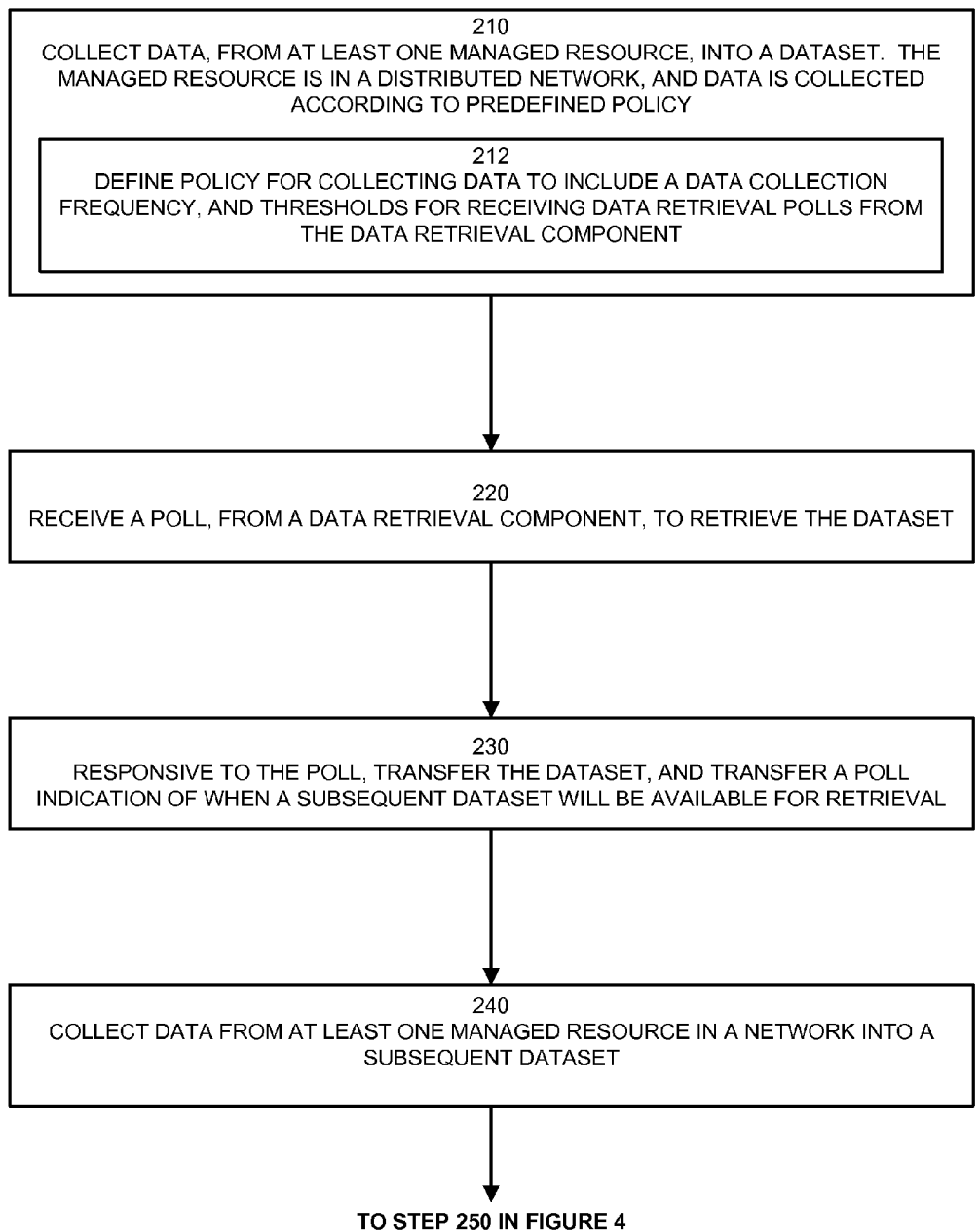
FIGS. 3-4 are flowcharts illustrating an example method for data retrieval according to embodiments herein.
Figure 4:
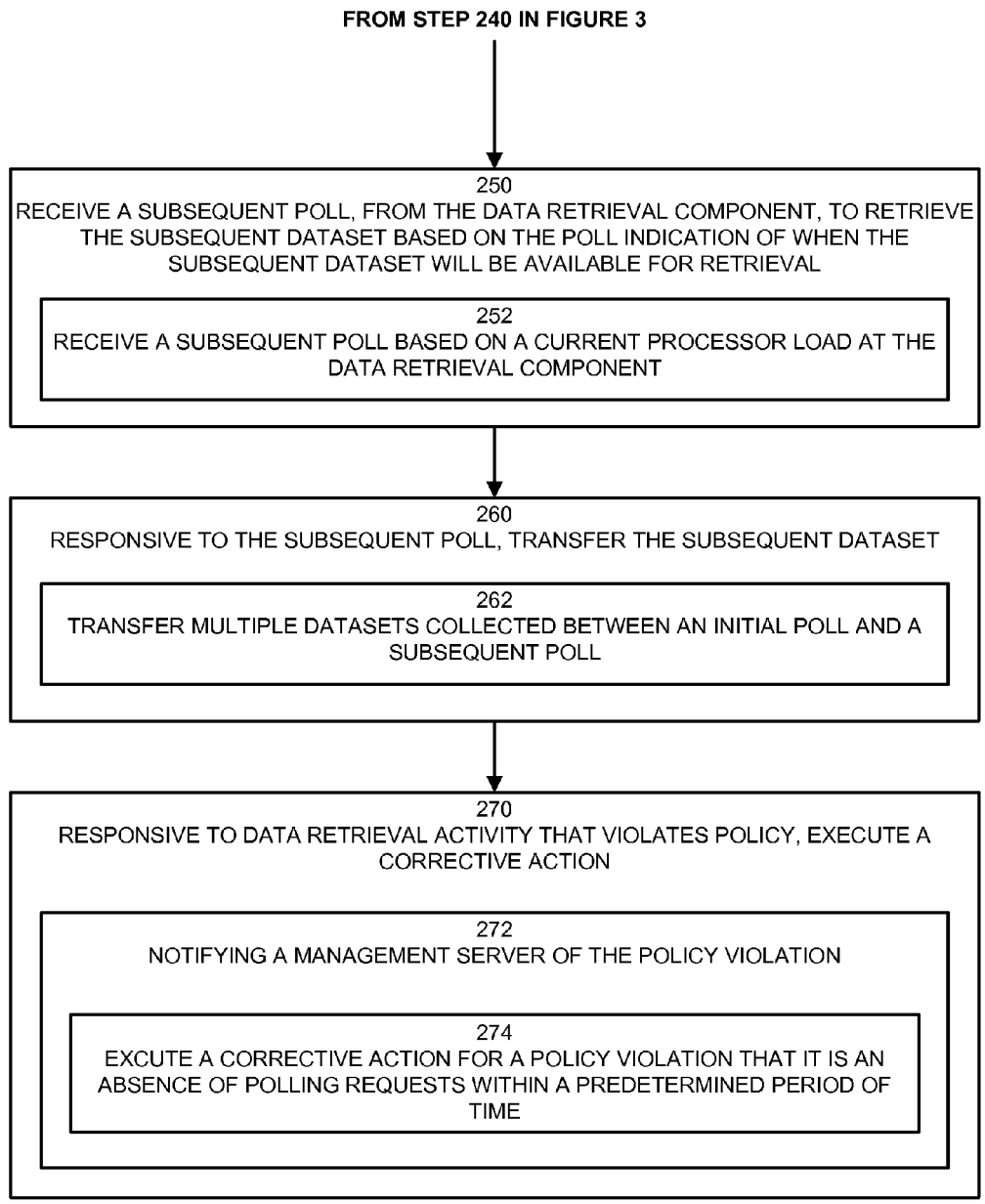

FIGS. 3-4 are flowcharts of processing steps that data collection agent 155 performs to execute a data collection process in accordance with example embodiments.

In step 210, data collection agent 155 collects data, from at least one managed resource, into a dataset. The data collection agent collects data according to predefined policy. In step 212, data collection agent 155 defines a policy for collecting data to include a data collection frequency, and thresholds for receiving data retrieval polls from the data retrieval component. A data collection frequency defines how often the data collection agent collects data from managed resources. For example, a policy instructs a data collection agent to collect performance data from a particular router every five minutes. Thresholds for receiving data retrieval polls indicate how often the data collection agent should receive polls for datasets. By way of a non-limiting example, a policy instructs the data collection agent to collect and generate datasets every 10 minutes, and to indicate that such datasets can be retrieved every 10 minutes. The example policy also indicates a threshold of three polls per hour. In other words, data can be polled and retrieved every 10 minutes, but if data is not polled and retrieved at least three times per hour, then the data collection agent notes a retrieval policy violation.

In step 220, data collection agent 155 receives a poll, from a data retrieval component, to retrieve the dataset. In step 230, responsive to the poll, data collection agent 155 transfers the dataset and transfers a poll indication of when a subsequent dataset will be available for retrieval. In step 240, the data collection agent 155 collects data from at least one managed resource in a network into a subsequent dataset.

In step 250, the data collection agent 155 receives a subsequent poll, from the data retrieval component, to retrieve the subsequent dataset based on the poll indication of when the subsequent dataset will be available for retrieval. In step 252, data collection agent 155 receives the subsequent poll based on the current processor load at the data retrieval component. The data retrieval component regularly executes other storage area network processes. Such processes can take priority over polling for datasets of management data. At the time the subsequent dataset is ready for retrieval, data retrieval component may be executing higher-priority processes such that the data retrieval component does not have the capacity to poll at the indicated time. In other words, a data retrieval component may be too busy to poll for datasets at the indicated time, and so the data collection agent receives a subsequent poll when the data retrieval component is not busy.

In step 260, responsive to the subsequent poll, the data collection agent 155 transfers the subsequent dataset. In other words, data collection agent 155 continues to transfer datasets according to the pull-model. In step 262, the data collection agent 155 transfers multiple datasets collected between an initial poll and a subsequent poll. The data collection agent 155 waits for polls or requests before transferring collected datasets. Although the data collection agent indicates when a next dataset will be available for retrieval (via the poll indication), the data collection agent does not always receive a poll at the time the dataset is ready. The data collection agent 155 can receive a poll after collecting several datasets. In other cases, data collection agent 155 simultaneously collects data from multiple managed resources on a distributed network, and thus has several datasets available by the next poll indication.

Because the data retrieval process is generally not the highest priority process operating on a centralized server, polls will usually be delayed by some amount. This embodiment capitalizes on the delay to make a weakness a strength by shipping multiple pieces of data at one time. Shipping multiple pieces of data at one time can be part of a configurable policy sent to the data collection agent. The data retrieval policy can also be configured to minimize the number of connections. To have several pieces of data transfer simultaneously, data retrieval component chooses a poll time large enough to accommodate the collection of data from multiple network resources. Alternatively, a duration between poll times can be set by a network administrator based on user requirements. If a user wanted data to be available at the data retrieval component as data is produced, then the user would increase the number of polls. If a user is not concerned about the availability of data from a centralized database, but wants to conserve network bandwidth between the data retrieval component and the data collection agent, then the user would increase the time between polls. By way of a non-limiting example, a polling policy can be changed based on a user's work schedule. If a user is not working from 10:00 p.m. to 5:00 a.m., then the data retrieval component does not need to poll every minute. Instead, the user can change the policy for nighttime versus daytime.

In step 270, responsive to data retrieval activity that violates a data retrieval policy, the data collection agent 155 executes a corrective action. In step 272, data collection agent 155 notifies management server 132 of the policy violation as a corrective action. In step 274, the data collection agent 155 executes a corrective action or policy violation that is in response to an absence of polling requests within a predetermined period of time. In the example above, a policy violation might be failing to receive a minimum number of polls within a specific time frame, such as three polls per hour. In such a case, the data collection agent notifies the management server that the data collection agent is not receiving polls for datasets. The management server 132 can then use this information to remedy the problem, such as by reassigning a new data retrieval component to the data collection agent. In situations where only one data retrieval component can collect data from a specific data collection agent, and the data retrieval component has not collected data within a given time, and the server can instruct the data retrieval component to restart and collect data from a data collection agent. In network environments where there is a master agent running on the same host as a data retrieval component, the master agent can restart the data retrieval process according to established protocols.

Figure 5:
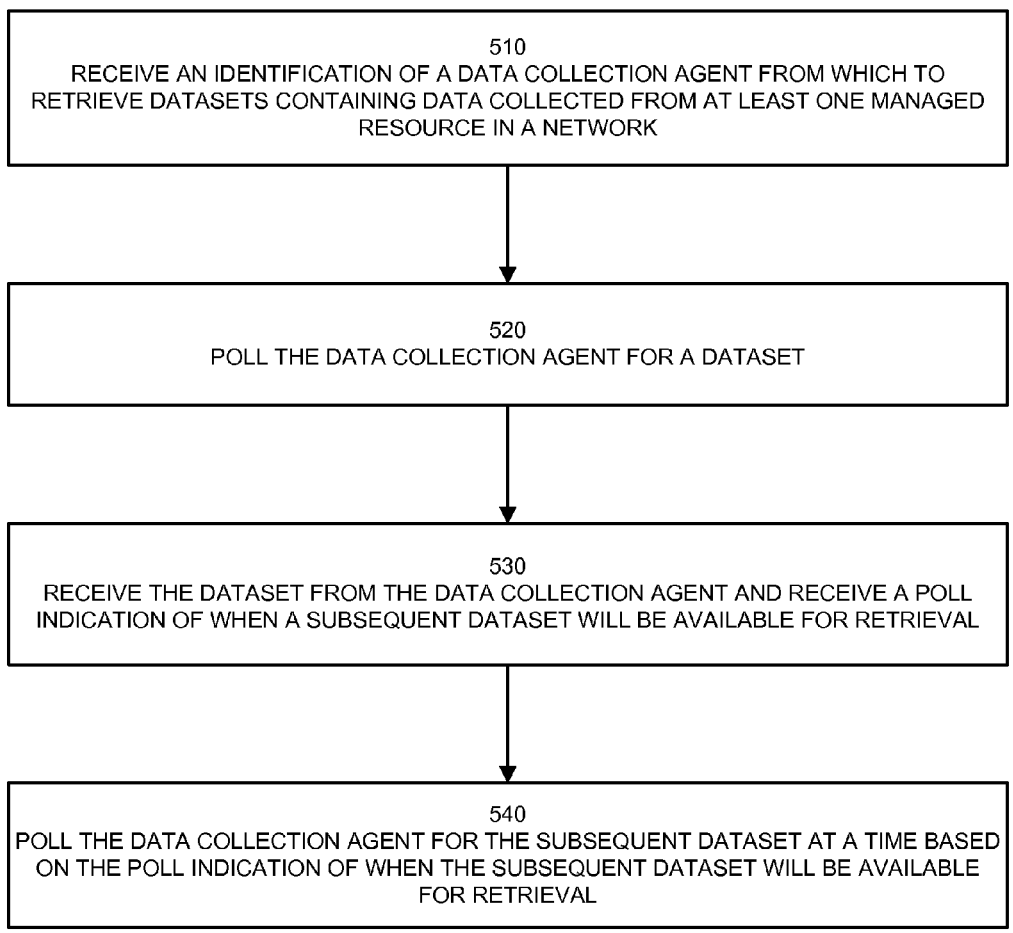
FIG. 5 is a flowchart illustrating an example method for data retrieval according to embodiments herein.

FIG. 5 is a flowchart of processing steps that data retrieval component 140 performs to execute a data retrieval process in accordance with example embodiments.

In step 510, the data retrieval component 140 receives an identification of a data collection agent from which to retrieve datasets. Such datasets contain data collected by that agent from at least one managed resource in a network. Preferably, the data retrieval component 140 receives such an agent identification from a management server. Such identification can include a ticket and an IP address of the data collection agent.

In step 520, the data retrieval component 140 polls the data collection agent for a dataset. In other words, the data retrieval component asks for management data that the data collection agent generated from monitoring one or more resources on the network.

In step 530, the data retrieval component 140 receives the dataset from the data collection agent, and the data retrieval component receives a poll indication of when a subsequent dataset will be available for retrieval. Because this embodiment uses a pull model for retrieving data, knowing when to poll for data makes the data retrieval process intelligent and efficient. The data retrieval component 140 can be configured to poll at specified intervals, but such a configuration can waste processor cycles when there are no datasets available for retrieval.

In step 540, the data retrieval component polls the data collection agent for the subsequent dataset at a time based on the poll indication of when the subsequent dataset will be available for retrieval. In other words, the data retrieval component 140 knows when a subsequent dataset will be available, and thus the data retrieval component can poll for the subsequent dataset at such time.

Figure 6:
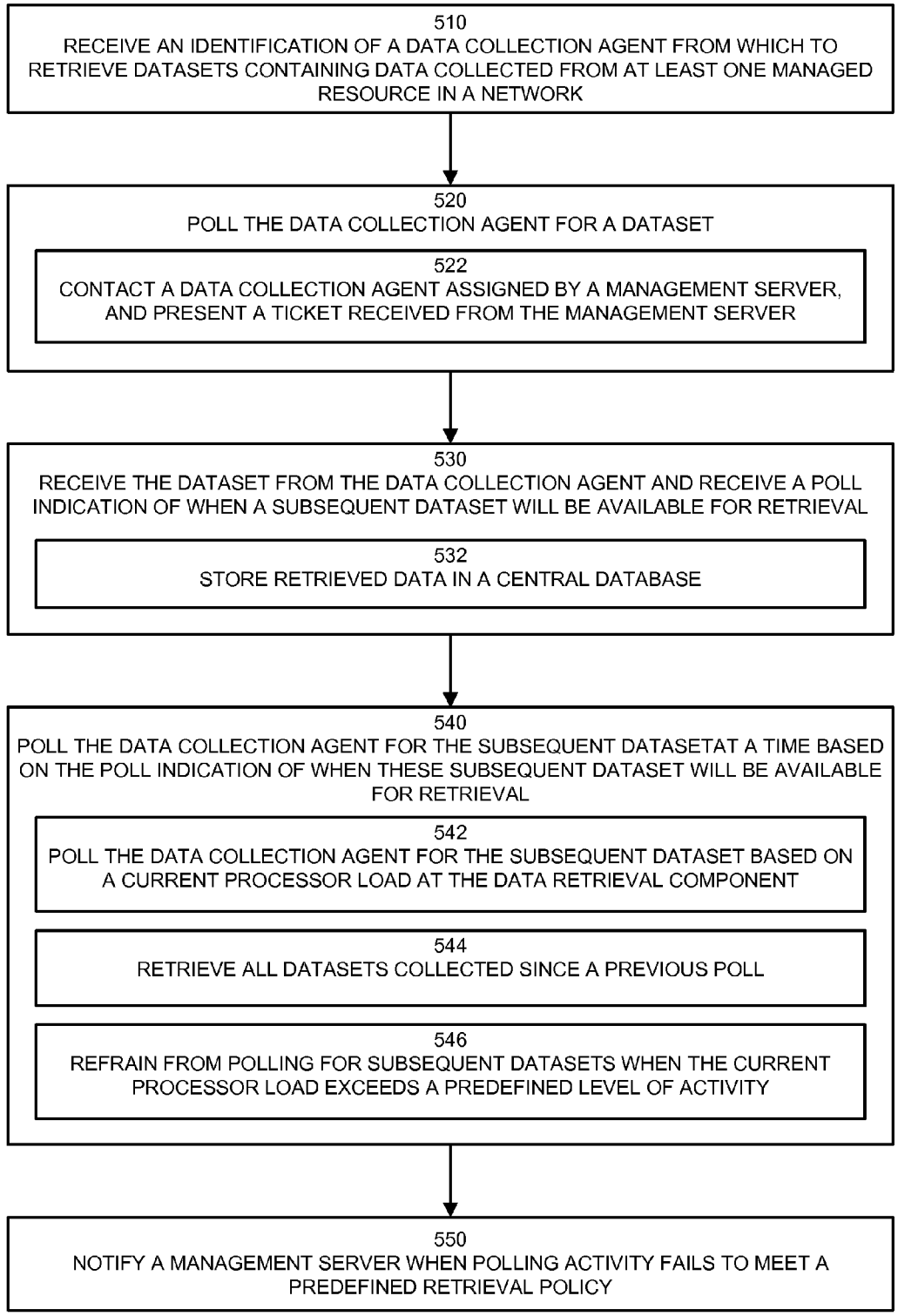
FIG. 6 is a flowchart illustrating an example method for data retrieval according to embodiments herein.

FIG. 6 is a flowchart of processing steps that data retrieval component 140 performs to execute a data retrieval process in accordance with example embodiments.

In step 510, the data retrieval component 140 receives an identification of a data collection agent from which to retrieve datasets.

In step 520, the data retrieval component 140 polls the data collection agent for a dataset. In step 522, data retrieval component 140 contacts a data collection agent assigned by a management server. Upon contacting the data collection agent, data retrieval component presents a ticket received from the management server. Preferably, the management server is used to make an initial assignment between a data retrieval component and a data collection agent. After such initial assignment between an agent and a data retrieval component, the management server does not need to continuously communicate with the data retrieval component and the data collection agent. The advantage of this embodiment is improved efficiency as the management server does not need to be kept in the loop for all data retrieval processes.

In step 530, the data retrieval component 140 receives the dataset from the data collection agent, and the data retrieval component receives a poll indication of when a subsequent dataset will be available for retrieval. In step 532, data retrieval component 140 stores retrieve data in a central database, such as database 160. Centrally storing such data enables subsequent performance analysis across a network, and enables a network administrator to investigate or drill-down into details associated with a network issue.

In step 540, the data retrieval component polls the data collection agent for the subsequent dataset at a time based on the poll indication of when the subsequent dataset will be available for retrieval. In step 542, data retrieval component 140 polls the data collection agent for the subsequent dataset based on a current processor load at the data retrieval component. By way of a non-limiting example, in cases where the data retrieval component is busy processing higher priority operations the data retrieval component can delay a subsequent poll to a time when the data retrieval component is not busy. In step 544, data retrieval component 140 retrieves all datasets collected since the previous poll. When the data retrieval component is busy and delays polling for datasets, data collection agent 155 can have multiple datasets collected during the delay. In step 546, data retrieval component 140 refrains from polling for subsequent datasets when the current processor load exceeds a predefined level of activity. In other words a network administrator can configure the data retrieval component such that when, for example, the data retrieval component does not poll for data when the associated processor exceeds 80% capacity.

In step 550, data retrieval component 140 notifies management server when polling activity fails to meet a predefined retrieval policy. In this process, the data retrieval component can use intelligent processing notify management server 132 when the data retrieval component 140 is unable to complete an assignment. This enables the management server to make adjustments or reassign data retrieval activities.

Another embodiment of the invention is a storage area network for data retrieval in a distributed environment. Data collection agents collect data within the distributed network environment. A data retrieval component is in communication with the data collection agent. The data retrieval component also communicates with a database. The management server communicates with both the data collection agent and the data retrieval component. The management server communicates to the data collection agent a policy for collecting data from one or more managed network resources to generate datasets. The management server identifies and assigns a data retrieval component to retrieve data from the data collection agent. This identification includes a ticket, to identify the data collection agent and datasets to retrieve, and an IP address, to identify the location of the data collection agent. The management server is involved in the initialization of the real-time data collection cycle, afterwards the data retrieval component and the data collection agent communicate to each other directly, unless there is some management action that the server needs to execute.

The data retrieval component has computer program code to execute a process 145 that polls the data collection agent for datasets. Such polling the data collection agent can include transmitting the ticket received from the management server. The collection agent as program code to execute process that transmits a dataset, and transmits the poll indication of when a subsequent dataset will be available for retrieval. The data retrieval component has computer program code to execute a process that polls the data collection agent for the subsequent dataset based on the poll indication of when the subsequent dataset will be available for retrieval.

As part of a framework for data retrieval, components of the system can be configured based on user preferences. With this framework, the solution can be adapted to the needs of each user. One preference is assignment type. Assignment type is preferably determined by the management server. For example, the management server provides options for a user to define the data retrieval component assignment type as one of static assignment or dynamic assignment. In a dynamic assignment, a network administrator decides, based on various network variables, which data retrieval component should be assigned to which data collection agent. There are several variables that factor in the decision of picking a data retrieval component. Such variables include availability, location, user preference, type of data, existence of a network address translation environment, and other network configuration characteristics. In a static assignment model, the management server determines assignments among the data retrieval component and data collection agents.

Another preference is type of connection. A connection type can be transient or persistent. The examples above describe transient connections. In a transient connection, whenever the data retrieval component needs to pull data from the data collection agent, the data retrieval component establishes a connection. Once the transmission is complete the connection is dropped. In a persistent connection, the data retrieval component establishes a connection that is kept alive or active. With a persistent connection, the data collection agent can push data at any time. A persistent connection is better for real-time data collection, but worse when considering security issues.

Another preference type is a protocol for retrieving data. Such protocol selections include pushing datasets regularly, polling for datasets regularly, and intelligence polling. A push protocol enables real-time data retrieval and analysis. A pull protocol results in increased security. An intelligent polling protocol results in a scalable, low-overhead mechanism for data retrieval that approximates real-time data retrieval.

Those skilled in the art will understand that there can be many variations made to the operations of the data retrieval process and application explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A computer-implemented method for data retrieval by a data collection agent operating on a host computer system in a distributed network, the method comprising:
    collecting data from at least one managed resource in the distributed network into a dataset at the data collection agent according to a predefined policy including a data collection frequency;
    receiving a poll from a data retrieval component in the distributed network to retrieve the dataset from the data collection agent, wherein the poll causes the data collection agent to transfer the dataset to the data retrieval component according to a firewall hole dedicated to the data retrieval component and wherein the predefined policy further includes a threshold for receiving data retrieval polls from the data retrieval component;
    responsive to the poll, transferring the dataset to the data retrieval component, and transferring a poll indication to the data retrieval component indicating when a subsequent dataset will be available for retrieval from the data collection agent by the data retrieval component according to a subsequent poll from the data retrieval component;
    collecting data from the at least one managed resource in the distributed network into a subsequent dataset at the data collection agent according to the predefined policy; and
    receiving the subsequent poll from the data retrieval component in the distributed network to retrieve the subsequent dataset from the data collection agent at a time based on the poll indication transferred from the data collection agent to the data retrieval component indicating when the subsequent dataset would be available for retrieval from the data collection agent by the data retrieval component.

2. The method of claim 1, wherein receiving a subsequent poll, from the data retrieval component, to retrieve the subsequent dataset is further based on a current processor load at the data retrieval component.

3. The method of claim 2, further comprising responsive to the subsequent poll, transferring the subsequent dataset.

4. The method of claim 3, further comprising transferring multiple datasets collected between an initial poll and a subsequent poll.

5. The method of claim 4, wherein polls received are sent from within a network address translation environment.

6. The method of claim 1, wherein responsive to data retrieval activity that violates policy, executing a corrective action.

7. The method of claim 6, wherein executing a corrective action comprises notifying a management server of the policy violation.

8. The method of claim 7, wherein the policy violation of the data retrieval activity is an absence of polling requests within a predetermined period of time.

9. A computer-implemented method for data retrieval by a data retrieval component computerized device in a distributed network, the method comprising:
    polling a data collection agent in the distributed network to retrieve a dataset, containing data collected from at least one managed resource in the distributed network by the data collection agent according to a predefined policy including a data collection frequency and a threshold for receiving data retrieval polls from the data retrieval component, wherein the poll causes the data collection agent to transfer the dataset to the data retrieval component according to a firewall hole dedicated to the data retrieval component;
    receiving the dataset from the data collection agent, and receiving a poll indication from the data collection agent indicating when a subsequent dataset will be available for retrieval from the data collection agent by the data retrieval component according to a subsequent poll to the data collection agent; and
    subsequently polling the data collection agent in the distributed network to retrieve the subsequent dataset from the data collection agent, containing data collected from at least one managed resource in the distributed network by the data collection agent according to the predefined policy, at a time based on the poll indication transferred from the data collection agent to the data retrieval component indicating when the subsequent dataset would be available for retrieval from the data collection agent by the data retrieval component.

10. The method of claim 9, wherein polling the data collection agent for the subsequent dataset, is based on a current processor load at the data retrieval component.

11. The method of claim 10, further comprising refraining from polling subsequent datasets when the current processor load exceeds a predefined level of activity.

12. The method of claim 11, further comprising notifying a management server when polling activity fails to meet a predefined retrieval policy.

13. The method of claim 10, wherein the subsequent polling retrieves all datasets collected since a previous poll.

14. The method of claim 13, further comprising storing retrieved data in a central database.

15. The method of claim 14, wherein polling the data collection agent comprises contacting a data collection agent assigned by a management server, and presenting a ticket received from the management server.

16. A system comprising:
    a data collection agent operating on a host computer system configured to collect data within a distributed network into datasets containing data collected from at least one managed resource in the distributed network by the data collection agent according to a predefined policy including a data collection frequency;
    a data retrieval component computerized device in communication with the data collection agent configured to poll the data collection agent in the distributed network to retrieve the datasets, wherein the predefined policy further includes a threshold for receiving data polls from the data retrieval component;

wherein the data collection agent includes computer program code to execute a process that collects data from at least one managed resource in the distributed network into a dataset at the data collection agent according to the policy;

wherein the data retrieval component includes computer program code to execute a process that polls the data collection agent in the distributed network to retrieve the dataset from the data collection agent, wherein the poll causes the data collection agent to transfer the dataset to the data retrieval component according to a firewall hole dedicated to the data retrieval component;

wherein the data collection agent includes computer program code to execute a process that receives the poll from the data retrieval component in the distributed network to retrieve the dataset from the data collection agent and, responsive to the poll, transfers the dataset from the data collection agent to the data retrieval component, and transfers a poll indication from the data collection agent to the data retrieval component indicating when a subsequent dataset will be available for retrieval from the data collection agent by the data retrieval component according to a subsequent poll from the data retrieval component;

wherein the data retrieval component includes computer program code to execute a process that receives the dataset from the data collection agent, and receives the poll indication from the data collection agent indicating when the subsequent dataset will be available for retrieval from the data collection agent by the data retrieval component according to the subsequent poll to the data collection agent;

wherein the data collection agent includes computer program code to execute a process that collects data from the at least one managed resource in the distributed network into the subsequent dataset at the data collection agent according to the predefined policy;

wherein the data retrieval component includes computer program code to execute a process that subsequently polls the data collection agent in the distributed network to retrieve the subsequent dataset from the data collection agent at a time based on the poll indication transmitted from the data collection agent to the data retrieval component indicating when the subsequent dataset would be available for retrieval from the data collection agent by the data retrieval component; and wherein the data collection agent includes computer program code to execute a process that receives the subsequent poll from the data retrieval component in the distributed network to retrieve the subsequent dataset from the data collection agent at the time based on the poll indication transferred from the data collection agent to the data retrieval component indicating when the subsequent dataset would be available for retrieval from the data collection agent by the data retrieval component.

17. The system of claim 16, wherein the management server, responsive to user configuration, defines a data retrieval component assignment type as one of static assignment and dynamic assignment, and wherein the management server defines a connection type, between the data retrieval component and the data collection agent, is one of persistent or transient, and wherein the management server defines a protocol for retrieving data.

18. The system of claim 17, wherein data collected by the data collection agent includes performance data.

19. The system is claim 18, wherein the data collection agent has further computer program code to execute a process that notifies the management server when polling by the data retrieval component violates a data retrieval process.

* * * * *